United States Patent
Hirai et al.

(10) Patent No.: US 6,398,647 B1
(45) Date of Patent: Jun. 4, 2002

(54) METHOD FOR DISPLAYING A REPRODUCED IMAGE OF A GAME

(75) Inventors: Susumu Hirai; Masaru Sugahara, both of Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/194,786

(22) PCT Filed: Apr. 3, 1998

(86) PCT No.: PCT/JP98/01545

§ 371 (c)(1),
(2), (4) Date: Apr. 6, 1999

(87) PCT Pub. No.: WO98/43715

PCT Pub. Date: Oct. 8, 1998

(30) Foreign Application Priority Data

Apr. 3, 1997 (JP) ................................. 9-084995

(51) Int. Cl.[7] .......................... A63F 13/10; G09T 15/70
(52) U.S. Cl. ............................................ 463/31; 345/473
(58) Field of Search .......................... 463/1–7, 31, 34, 463/36, 24, 29; 345/473, 474, 958, 959

(56) References Cited

U.S. PATENT DOCUMENTS

| | | | | |
|---|---|---|---|---|
| 4,342,454 A | * | 8/1982 | Baer et al. ..................... 463/31 |
| 5,261,820 A | * | 11/1993 | Slye et al. ...................... 434/43 |
| 5,269,687 A | * | 12/1993 | Mott et al. ..................... 434/69 |
| 5,366,376 A | * | 11/1994 | Copperman et al. ........... 434/69 |
| 5,395,242 A | * | 3/1995 | Slye et al. ...................... 434/43 |
| 5,717,848 A | * | 2/1998 | Watanabe et al. ............. 245/474 |
| 5,779,548 A | * | 7/1998 | Asai et al. ...................... 463/31 |
| 5,850,352 A | * | 12/1998 | Moezzi et al. ............... 345/419 |

OTHER PUBLICATIONS

WO96/00601, Jan. 11, 1996, abstract.
Patent Abstracts of Japan, 08–293810, Nov. 5, 1996.
Patent Abstracts of Japan, 08–024441, Jan. 30, 1996.
Patent Abstracts of Japan, 09–108446, Apr. 28, 1997.
Patent Abstracts of Japan, 09–140938, Jun. 3, 1997.
Patent Abstracts of Japan, 08–305891, Nov. 22, 1996.

* cited by examiner

*Primary Examiner*—Joe H. Cheng
*Assistant Examiner*—Kathleen M. Christman
(74) *Attorney, Agent, or Firm*—Dickstein Shapiro Morin & Oshinsky LLP

(57) ABSTRACT

When a replay condition is established in advance of a game, a reproduced image which replays a specific scene in the advance of the game is displayed. In displaying the reproduced image, a parameter in the specific scene in the advance of the game is corrected for replay, and the specific scene is reproduced based on the corrected parameter. When the game display is resumed, a stored parameter is read. Suitable replay images can be displayed.

7 Claims, 14 Drawing Sheets

FIG. 4
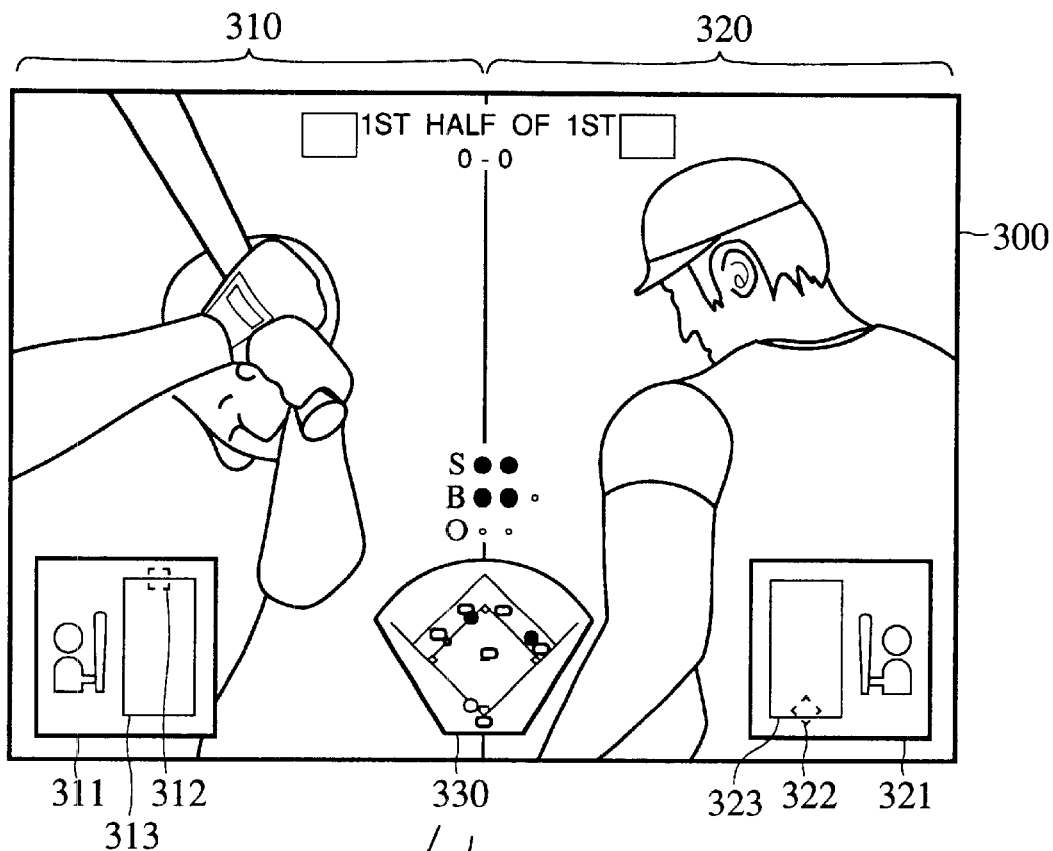
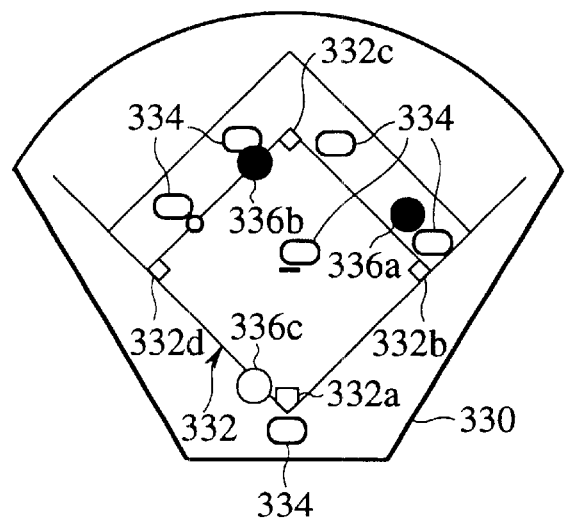

METHOD FOR DISPLAYING A REPRODUCED IMAGE OF A GAME

TECHNICAL FIELD

The present invention relates to a game image display method and a game control method, more specifically to a game image display method and a game control method suitable for a baseball game.

BACKGROUND ART

Accompanying the recent development of computer graphic techniques, so-called 3D games, which use three-dimensional cubic image displays, have become gradually prevalent in game apparatuses in amusement facilities and domestic video game apparatuses.

The baseball game is one of the most popular sport games and has established popularity. Baseball games have been presented in 3D games using three-dimensional cubic image displays.

In the so-called 3D baseball game, in which three-dimensional displays can be made, displays are presented at various view points in accordance with developments of the baseball game. For example, a display of batting as viewed by a catcher, a display of pitching as viewed by a pitcher, a display of a defense as viewed at the outfield, a display of base running by a base runner as viewed at the diamond and other displays are changeably made, whereby the baseball game is made realistic.

In judging a catch in such 3D baseball game, in some cases even though a catch is unsuccessful according to computation, the catch appears successful in a display, and in other cases, conversely although a catch is successful according to computation, the catch appears unsuccessful in a display. This makes feel game players awkward.

To make the 3D baseball game more interesting, when showy plays, such as a running catch, a headfirst slide, etc., are displayed, it is proposed to replay these plays. However, when these plays are replayed in slow motion, details of the replayed images are displayed outstandingly coarse.

In the conventional baseball game, basically, simply an offense operates a batter, and a defense operates a pitcher to thereby advance the game. As the operators become used to the game, they become unsatisfied with the simplicity of the baseball game. Baseball games which enable more sophisticated operations and require higher tension have been expected.

In the conventional baseball game, a sub-screen is provided for displaying a general layout of the players so as to see developments of the game, but as the game becomes complicated, it is difficult to correctly see developments of the game only by simply displaying layouts of the players.

A first object of the present invention is to provide a game image display method which can display a suitable replay image.

A second object of the present invention is to provide a game control method which can realize judgements which do not make feel game players awkward.

A third object of the present invention is to provide a game control method which enables the game to be played with tension.

A fourth object of the present invention is to provide a game image display method which facilitates grasping developments of the game.

DISCLOSURE OF THE INVENTION

The above-described object is achieved by a game image display method for displaying a reproduced image to replay a specific scene in an advancing game. When the reproduced image is displayed, a parameter of a motion of a mobile object displayed on the specific scene being corrected, and the specific scene is reproduced based on the corrected parameter. Whereby suitable replay images can be displayed.

In the above-described game image display method it is possible that the reproduced image is replayed in slow motion on the specific scene.

In the above-described game image display method it is possible that on the specific scene a first object impinges on a second object; on the specific scene it is judged that the first object impinges on the second object when a distance between the first and the second objects is within a prescribed range; and a positional parameter of the first object and/or the second object is changed so that a position of the first object agrees with a position of the second object in the reproduced display on the specific scene.

The above-described object is achieved by a game control method for controlling a specific character by operating operation buttons. Operations of the operation buttons are combined to make a specific operational command for a character to be operated whereby characters including a character to be operated are can be sophisticatedly operated.

In the above-described game control method it is possible that a prescribed display is made to indicate that the specific operational command has been accepted.

In the above-described game control method it is possible that the prescribed indication is made even when the specific operational command made by operating the operational buttons is invalid.

The above-described object is achieved by a game control method in which when a main game advances to a prescribed specific scene, a sub-game which is different from the main game is executed, and a game result of the sub-game is reflected to advance of the main game.

In the above-described game control method it is possible that the sub-game is executed while the specific scene of the main game is being displayed in slow motion.

The above-described object is achieved by a game image display method for displaying game contents on a game screen, wherein a sub-screen for displaying advance of the game is provided on the game screen, and a position and motions of a character are displayed on the sub-screen.

In the above-described game image display method it is possible that the character is displayed in a different color to distinguishably display a motion of the character.

The above-described object is achieved by a game control method for controlling a game which is advanced by using a character registered in advance, wherein the registered character is substituted by a substitute character, and the game is advanced by using the substituting character. Whereby advance of the game can be easily grasped.

The above-described object is achieved by a game control method for controlling a game in which a character responds to a motion of a mobile object which moves on a game screen, anticipating a track of movement of the mobile object; moving the character which is to reach the mobile object toward the mobile object when the mobile object starts moving, based on the anticipated track of the mobile object; and giving a distance between the mobile object and the character at a time when the character has come near to the mobile object, and judging that the character has reached the mobile object when the distance is within a prescribed range. Whereby the judgement does not make the game players feel awkward.

The above-described object is achieved by a game image display method for displaying a mobile object which moves on a game screen, and a character which reacts to a motion of the mobile object, determining a character which responds to a motion of the mobile object and a reaction motion of the character, based on the anticipated track of the mobile object; and displaying the reaction motion of the character when a distance between the mobile object and the character at a time when the character has come near to the mobile object, is within a prescribed range.

BRIEF DESCRIPTION OF THE DRAWINGS

FIG. 4 is views of a game display of pitching and batting of the game apparatus of the embodiment of the present invention.

BEST MODES OF PRACTICING THE INVENTION

A game apparatus of one embodiment of the present invention will be explained with reference to the drawings.

Constitution of the Game Apparatus

Figure 1:
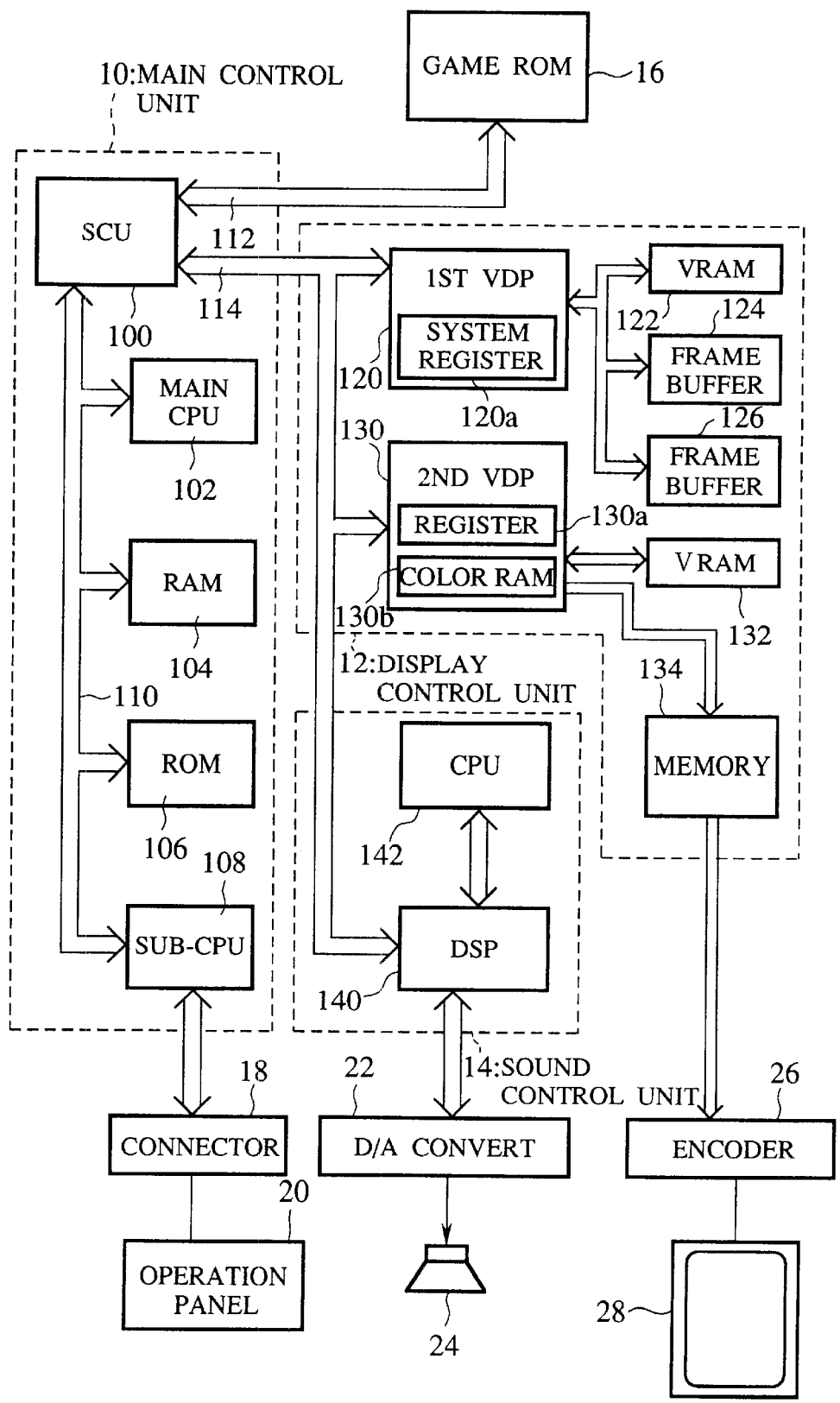
FIG. 1 is a block diagram of the game apparatus of one embodiment of the present invention.

A constitution of the game apparatus of the present embodiment will be explained with reference to FIG. 1.

The game apparatus comprises a main control unit 10 which generally controls the game apparatus, a display control unit 12 which controls display of game images, and a sound control unit 14 which generate effective sounds, etc.

The main control unit 10 includes an SCU (System Control Unit) 100, a main CPU 102, a RAM 104, a ROM 106 and a sub-CPU 108, and they are interconnected with each other by a bus 110.

The SCU 100 is connected to a game ROM 16 which stores game programs and to the display control unit 12 and the sound control unit 14 by a bus 114. The SCU 100 controls input/output of data among the main CPU 102, VDPs 120, 130, a DSP 140 and a CPU 142 through the buses 110, 112, 114.

The main CPU 102 incorporates the same computation function as a DSP (Digital Signal Processor) to execute at high velocity the game programs stored in the game ROM 16.

The RAM 104 is used as a work area of the main CPU 102, and temporarily stores a game program and character data.

The ROM 106 stores programs, such as an initial program for initialization, etc., and data which are common with various games.

The sub-CPU 108 is connected to an operation panel 20 through a connector 18. Operation buttons, etc. to be operated by a game player are provided on the operation panel 20. The operation panel 20 will be detailed later. The sub-CPU 108 is called SMPC (System Manager & Peripheral Control), and receives operation data from the operation panel 20 in response to a command of the main CPU 102 and supplies the data to the main CPU 102.

The main CPU 102 performs image controls, e.g., rotational transformation, perspective transformation, etc of characters in game displays. The image control will be detailed later.

The display control unit 12 includes the first VDP 120 which draws polygon images of backgrounds of characters, which are formed of polygon data, a VRAM 122, and frame buffers 124, 126 connected to the first VDP 120, the second VDP 130 which draws images of scroll background displays, image synthesis, based on display priority, of polygon image data and scroll image data, and clipping, and a VRAM 132 and the second VDP 130 and a memory 134 connected to the second VDP 130. The first VDP 120 and the second VDP 130 are connected to each other through the bus 114.

The first VDP 120 incorporates a system register 120a. Drawing data of polygons representing characters are supplied to the first VDP 120 through the main CPU 102 and written in the VRAM 122. The drawing data written in the VRAM 122 are drawn in the drawing frame buffer 122 or 124. The drawing data drawn in the frame buffer 122 or 134 are supplied, in a display mode, to the second VDP 130. Thus the two frame buffers 122, 134 are changed over for drawing and display of each frame.

On the other hand, information for controlling drawing is set by the main CPU 102 in the system register 120a of the first VDP 120 trough the SCU 100. Based on the control information set in the system register 120a the first VDP 120 controls drawing and display.

The second VDP 130 incorporates a register 130a and a color RAM 130b. Image data are defined by the main CPU 102 in the VRAM 132 and the color RAM 130b through the SCU 100. Information for controlling image display are also set in the register 130a by the main CPU 102 through the SCU 100. The data defined in the VRAM 132 are read based on the control information set in the register 130a of the second VDP 130 to be image data of a scroll displays representing backgrounds of characters. The image data of the respective scroll displays and polygon image data of characters supplied by the first VDP 120 are given display priority, based on the control information set in the register 130a and synthesized into final display image data.

Color data defined in the color RAM 130b are read by the second VDP 130, based on the display image data, and display color data are generated and stored in the memory 134.

The display color data are stored in the memory 134 and then outputted to an encoder 26. The encoder 26 adds synchronization signals, etc. to the image data to generate image signals and outputs the image signals to a monitor 28. The monitor 28 display game displays.

The sound control unit 14 includes a DSP 140 which synthesizes sounds by PCM mode or FM mode. Sound data generated by the DSP 140 are converted into sound signals to be outputted by a speaker 24.

Operation Panel

Figure 2:
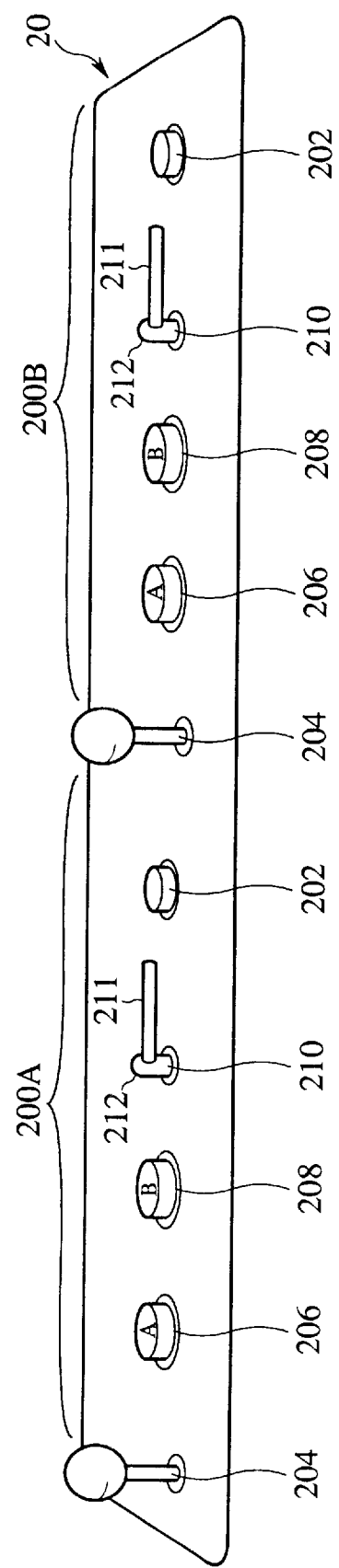
FIG. 2 is a view of an operation panel of the game apparatus of the embodiment of the present invention.

Next, the operation panel of he game apparatus of the present embodiment will be explained with reference to FIG. 2.

The operation panel 20 includes two sets of operation buttons, etc. On the left side of the operation panel 20 is disposed the operation buttons, etc. 200A for a first game player, and the operation buttons, etc. 200B for a second game player are disposed on the right side of the operation panel 20. The operation buttons, etc. 200A, 200B have the same constitution.

A start/time button 202 is disposed on the rightmost side of the operation buttons, etc. 200A, 200B. The start/time button 202 starts and temporarily pauses a game. When a game is not in operation, the game is started when the start-time button 202 is pressed, and when a game is in operation, the game is paused when the start/time button 202 is pressed.

Eight-direction levers 204 are disposed on the leftmost sides of the operation buttons, etc. 200A, 200B. The 8-direction levers 204 are operated to command 8 directions in each operation display which are forward and backward, and left and right. For example, upon pitching each 8-direction lever 204 is operated to command a position to which a pitcher throws a ball. On defense, the 8-direction lever 204 is operated to command a direction of throwing/base run. Upon batting, the 8-direction button 104 is operated to command a batting position.

Two sets of decision buttons, an A button 206 and a B button 208 are disposed each on the right sides of the 8-direction lever 204. The A buttons 206 and the B buttons 208 are used to make various commands in each operation display. Details will be explained later.

Bat-shaped switches 210 in the shape of a baseball bat are disposed respectively on the left sides of the A button 206 and the B button 208. In each bat-shaped switch 210 a bat 211 is rotated on a swing pin 212. The bat 211 is urged to rotate counter-clockwise on the swing pin 212 and normally is in contact with a stopper (not shown). A game player rotates the bat 211 clock-wise against an urging force and releases the bat 211, the bat 211 vigorously rotates back counter-clockwise, and comes into contact with the stopper (not shown) and stops. The stopper (not shown) limits the clock-wise return of the bat 211.

On the backside of each bat-shaped switch 210 a swing plate with, e.g., a magnet secured to the swing pin 21 is disposed for detecting a swing positional angle and a swing velocity of the bat 211, and a plurality of reed switches are disposed along a swing orbit of the magnet. As the swing plate is swung with the magnet on the swing plate coming within a prescribed range from the respective reed switches, the reed switches sequentially turn on, and the reed switches sequentially turn off as the magnet goes out of the prescribed range.

Basic Operation of the Game

A basic operation of the game apparatus of the present embodiment will be explained.

Upon a pitching, the 8-direction lever 204 is operated to move a pitcher cursor to indicate a pitching position. The pitching is commanded by the bat-shaped switch 210, and a pick-off is commanded by the B button 208. The pitching is timed with an operation timing of the bat-shaped switch 210.

Upon a defense, the 8-direction lever 204 is operated to command a throw/inter-base throw. A direction of the throw/inter-base throw is commanded by the 8-direction lever 204. For example, the 8-direction lever 204 is operated toward a third base direction to command the throw to the third base. A pitching is commanded by the B button 208. The bat-shaped switch 210 is not used.

Upon a batting, the 8-direction lever 204 is operated to move the batter cursor to a batting position. A strength of the batting is commanded by the bat-shaped switch 210. Basically a batting strength is commanded by a swing angle of the bat 211 of the bat-shaped switch 210. The operation of the bat-shaped switch 210 will be detailed later.

Upon a base run, the 8-direction lever 204 is used to command a base or the home base of the base run. The 8-direction lever 204 is operated to command a base by commanding a direction of the base run or home base run. The base run is commanded by the A button 206, and the home base run is commanded by the B button 208. The bat-shaped switch 210 is not used.

Operation of the Bat-Shaped Switch

The bat-shaped switch of the game apparatus of the present embodiment will be explained with reference to FIG. 3.

As described above, the bat-shaped switch 210 is operated by a game player on an offense who bats. The bat-shaped switch 210 is operated to give a batter various motions. In a baseball game players introducing display or a bisected display, when a game player on an offense operates the bat-shaped switch, the bats of the baseball players are moved interlocked with the motion of the bat switch, and the respective baseball players make shadow swings. The shadow swings of the respective baseball players may be different from each other to make the game various.

A common shadow swing of the respective baseball players will be explained.

Figure 3A:
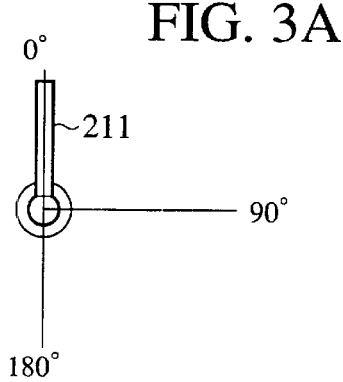
FIG. 3 is views explaining the operation of the bat-shaped switch of the game apparatus of the embodiment of the present invention.

As shown in FIG. 3(A), when the bat-shaped switch 210 is not moved at all, the batters in the display redo their grips of the bats in front of the bodies and posture relaxedly.

Figure 3B:
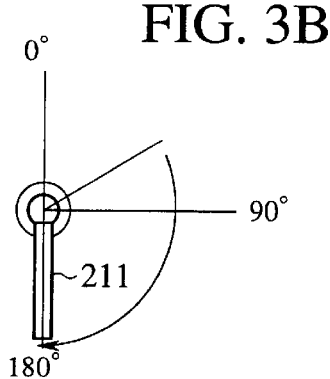

As shown in FIG. 3(B), when the bat 211 of the bat-shaped switch 210 starts to be pulled clock-wise, e.g., the bat 211 has passed a point of $75_E$, motions of the bats of the batters in the display are interlocked with the motion of the bat 211. The batters make a light shadow swing until an angle of the bat 211 reaches $180_E$.

Figure 3C:
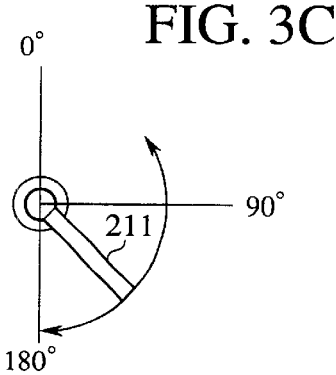

As shown in FIG. 3(C), when the bat 211 of the bat-shaped switch 210 is swung between $75_E$ and $179_E$, the batters in the display make a light shadow swing interlocked with the motion of the bat-shaped switch 210. When the bat 211 is stopped, the batters in the display redo their grips of the bats there.

When the game player releases the bat 211 of the bat-shaped switch 210, which has been pulled clock-wise, the batters in the display make a batting motion. Various batting motions are made corresponding to operations of the bat 211.

Figure 3D:
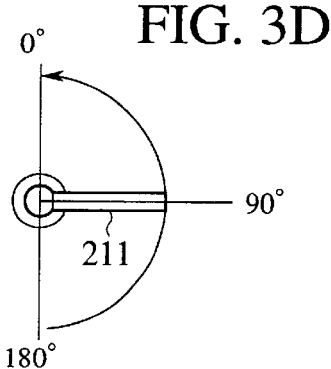
Figure 3E:
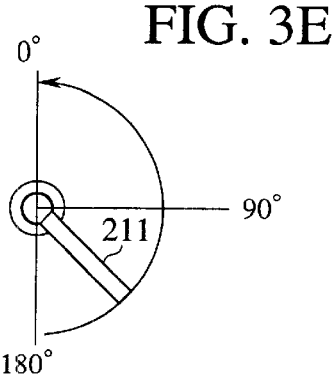

As exemplified in FIG. 3(D), when the bat 211 of the bat-shaped switch 210 is pulled to a position of 180$_E$ and is released, the batters in the display make a full swing. When the bat 211 of the bat-shaped switch 210 is released at a position between 75$_E$ and 179$_E$ as shown in FIG. 3(E), the batter in the display makes a motion from the shadow swing to a full swing. An angular position of the bat 211 is changed, whereby a batting strength can be changed.

Figure 3F:
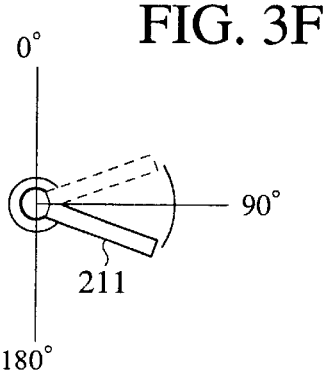
Figure 3G:
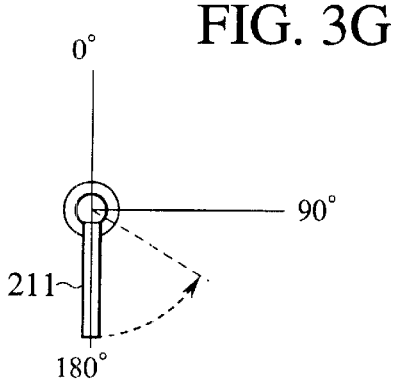

As shown in FIG. 3(F), the bat 211 of the bat-shaped switch 210 is stopped between 76$_E$ and 105$_E$ for a certain period of time, e.g., a period of time corresponding to more than 30 frames (1 minute) of the game display, a bunting mode is provided. The batter in the display bunts. In this sate the bat 211 is pulled beyond 105$_E$, and the bat 211 is released. The shadow swing motion is shifted to a batting.

Figure 3H:
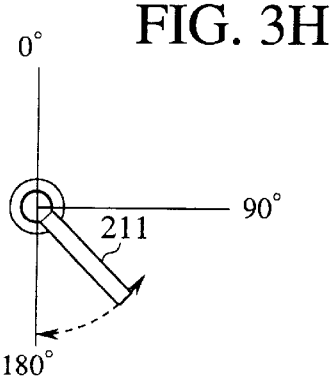

In the present embodiment, an initial velocity of the bat 211 of the bat-shaped switch 210 is detected, and when an initial velocity is above a prescribed value, a full-swing bunting motion is performed. However, if the start of a batting motion is judged based on only an initial velocity, it often happens that even a little release of the bat 211 of the bat-shaped switch 210 enables a swing motion at a velocity above a prescribed initial velocity. Then, according to the present embodiment, as shown in FIG. 3(H), even when an initial velocity of the bat 211 is above a prescribed value, a half-swing motion can be provided when the bat 211 does not pass a position of 90$_E$ within a prescribed period of time, e.g., 6 frames (0.2 seconds).

When the bat 211 of the bat-shaped switch 210 is thus paused, a half-swing motion can be provided, and a command which matches with an operational feeling of the game player can be made. Accordingly, a more realistic feeling of operating the bat-shaped switch 210 can be obtained.

Basic Displays of the Game

Basic displays of the game of the game apparatus of the present embodiment will be explained with reference to FIGS. 4 to 6.

FIG. 4 shows a game screen 300 with a pitching display and a batting display. The game screen 300 is bisected in a left and a right section. An offense uses the left screen 310, and a defense uses the right screen 320. A smaller batting position screen 311 for displaying a batting position is provided on the left offense screen 310. A strike zone 313 is indicated on the batting position screen 311. Similarly, a smaller pitching position screen 321 for displaying a pitching position is provided on the right defense screen 320. A strike zone 323 is displayed on the defense screen 320.

A radar screen 330 for generally displaying a baseball field for indicating advance of the baseball game is provided between the offense screen 310 and the defense screen 320.

As shown in FIG. 4, on the radar screen 330 a baseball field 332 having a home base 332*a*, a first base 332*b*, a second base 332*c* and a third base 332*d* is displayed, and positions of current defense outfielders 334, and current offense runners 336 are displayed. In addition, current states of the defense outfielders 334 and the offense runners are also displayed. As exemplified in FIG. 4, a first base runner 336*a* and a second base runner 336*b* are displayed in a different colors when they are taking leads.

As a mode of distinguishably displaying current states on the radar screen 330, in addition to the above-described display in a different color, they may be flashed or displayed in a different shape. Otherwise, these display modes may be combined.

A game player on a defense operates the 8-direction lever 204, watching the pitching position screen 321 on the defense screen 320 in FIG. 4, to freely change a pitching position upward and downward, and left and right. When a pitching position is changed, a pitcher cursor 322 on the pitching position screen 321 is moved. The game player commands a pitching position, watching the strike zone 323 and the pitcher cursor 322.

A game player on an offense operates the 8-direction lever 204, watching the batting position screen 311 on the offense screen 310, freely change a batting position upward and downward, and left and right. When a batting position is changed, a batter cursor 321 in the batting position screen 311 is moved. The game player swings the bat 211 of the bat-shaped switch 210 by an intended batting strength and operates the 8-direction lever 204 to command an intended position, watching the strike zone 313 and the batter cursor 312.

When the game players exchange the defense and the offense between them, the offense screen 310 and the defense screen 320 exchange their left and right positions so as to facilitate the operation by the game players.

Figure 5:
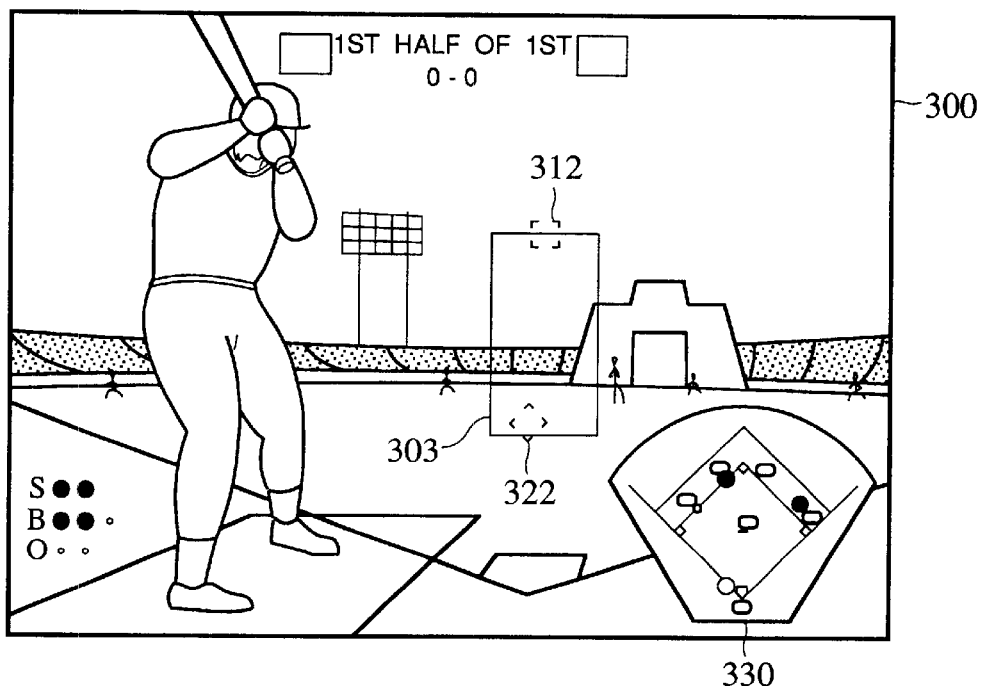
FIG. 5 is a view of a game display of pitching of the game apparatus of the embodiment of the present invention.

FIG. 5 shows the game screen 300 with a pitching displayed. When the game player on an defence presses the decision button 206, a pitcher starts to assume a pitching motion. As shown in FIG. 5, the offense screen 310 and the defense screen 320 are unified. On the unified game screen 300 the strike zone 303 is unified. The radar screen 330 is moved to the lower right.

Figure 6:
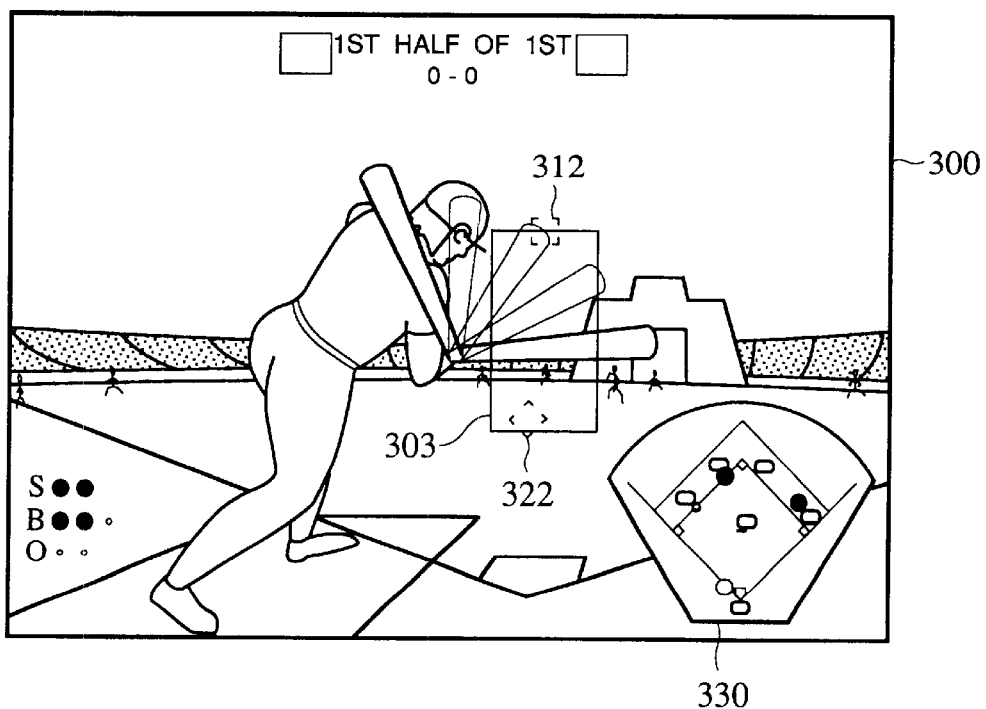
FIG. 6 is a view of a game display of batting of the game apparatus of the embodiment of the present invention.

FIG. 6 shows the game screen 300 with a batting displayed. When the offense game player releases the bat 211 of the bat-shaped switch 210, batting is performed at the intended at bat position with an intended batting strength. In FIG. 6 phantom images of a bat are made visible for realistic production.

In order to give the present embodiment a variety of displays, in addition to images as viewed in the ball running direction, images as viewed at plural set positions preset in the baseball field may be suitably used.

Lead of Runner and Check

Motions of a lead of a runner and a check in the game apparatus of the present embodiment will be explained with reference to FIG. 7.

In the present embodiment, in order to make tactics in a match game tense, when an offense reaches base, the runner can make a motion of a lead, and a defense can make a motion of picking off the runner taking a lead.

Figure 7:
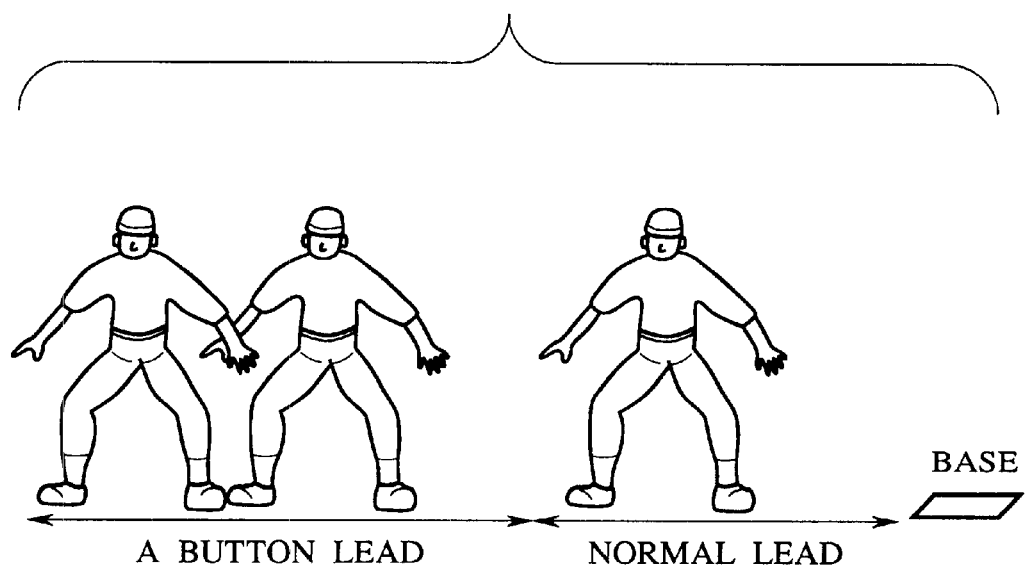
FIG. 7 is a view explaining a lead of a runner of the game apparatus of the embodiment of the present invention.

When an offense reaches base, in a pitching/batting display, a runner on a base takes a lead within a prescribed distance as a normal lead as shown in FIG. 7. Here, the A button 206 is repeatedly pressed to further take a lead, and a long-distance lead shown in FIG. 7 as an A button lead can be taken. In the A button lead it is more possible that the runner may be picked off. By pressing the B button 208 the runner can be returned onto the base. Then, the B button 208 is released, and the runner again takes a normal lead within the normal distance.

In a base steal, a running direction is commanded by the 8-direction lever 204, and the A button 206 is pressed. At the same time a pitcher begins to pitch, a runner begins to run for a steal. In a case that a plurality of runners, steal commands are repeatedly made, and the runner sequentially beings to run. In a steal, unless a runner takes a sufficient lead, it is more possible that he will be caught.

A defense can pick off runners. In a pitching/batting display, a base for a ball to be thrown to is commanded by the 8-direction lever 204, and the B button 208. And a pitcher throws a pick-off ball. The instant a runner takes a long-distance lead or has begun to run for a steal, a pick-off motion is made to thereby effectively catching the runner.

In a case that a runner takes a lead which is a maximum distance provided by the A button and is caught, even when a game player on an offense presses the B button 208, the runner can seldom return to the base. However, the runner mostly succeeds in a steal from the point.

In a case that a runner has a lead within the normal distance and is caught, a game player on an offense presses the B button 208, and the runner can return to the base by 100%. However, the runner rarely succeeds in a steal from this point.

Superplays

Superplays of the game apparatus according to the present embodiment will be explained.

The present embodiment includes a superplay mode which is developed by the respective game players pressing the respective A buttons and B buttons several times in the above-described normal operation for the following tense matches. A supermode may be indicated on the screen.

The superplay mode is provided, for runners, upon, e.g., a headfirst slide to the first base, an obstructive slide on the second base and a tackle on the home base; for infielders, upon, e.g., an acrobatic play on the second base, a jumping catch of a high liner; upon inputted motions preceding a backhand single catch, etc.; for the outfielders, upon, e.g., acrobatic plays, such as various jumping catches, etc.; and in inputted motions preceding a running catch or others.

In these superplays, plays of one of the game players who presses the A button 206 and the B button 208 more times than the other are advantageous. For example, when a runner makes a headfirst slide to the first base, pressing the A button 206 and the B button 208 more times in a prescribed period of time makes it more possible for the runner to be safe. In an inputted motion preceding an infielder's backhand catch or others, when the A button 206 or the B button 208 are pressed more times in a prescribed period of time, the ball has a higher velocity.

Command Input Plays

Figure 8:
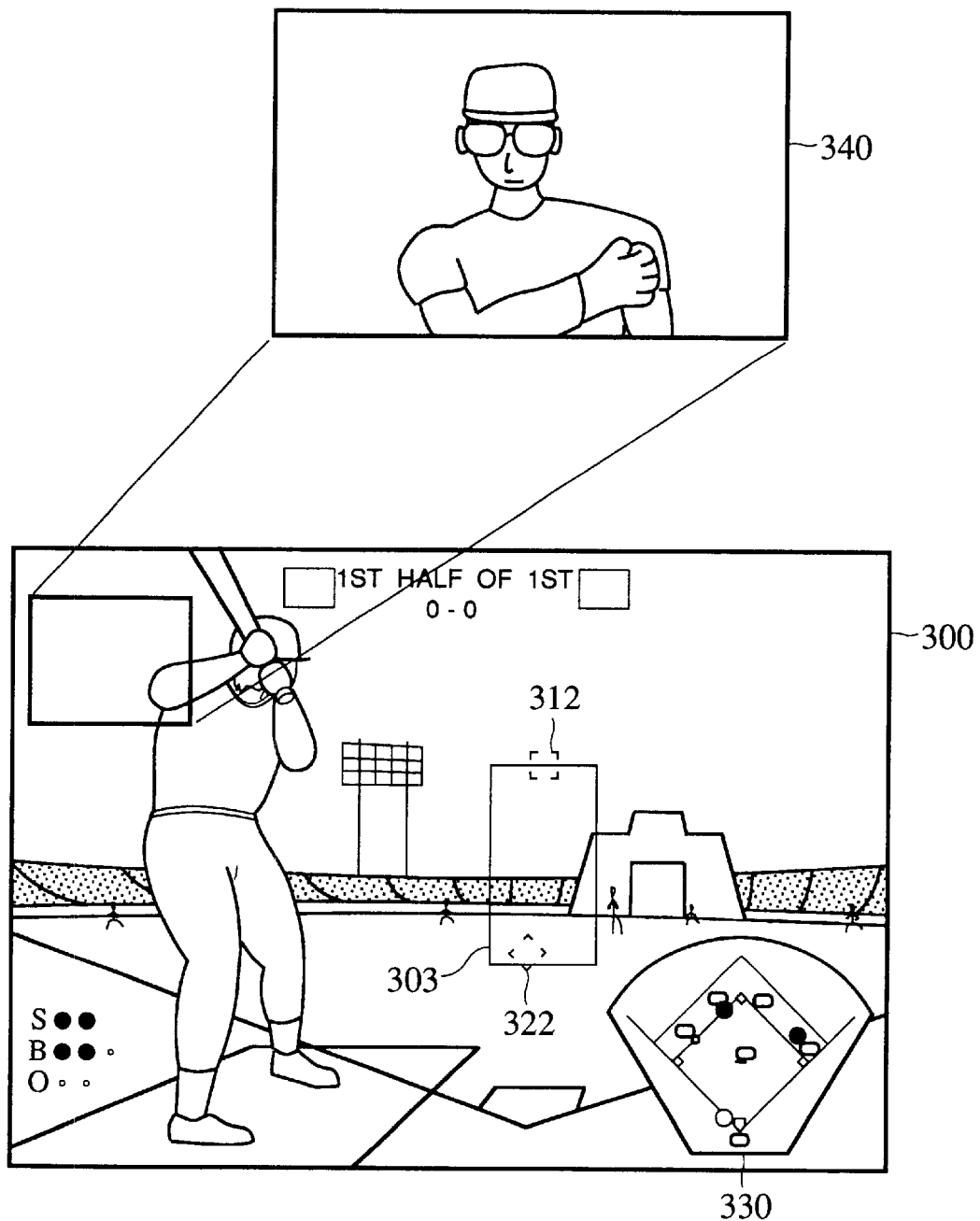
FIG. 8 is views of an indication of acceptance of a command input of the game apparatus of the embodiment of the present invention.

Command input plays of the game of the present embodiment will be explained with reference to FIG. 8.

In the present embodiment, in addition to the above-described normal operation, simple-command inputs can be made by pressing the A buttons 206 and the B buttons 208 for more sophisticated plays and tense tactics. A simple command is input in a short period of time of introducing the baseball game players, etc.

A characteristic of the command inputs is that a command is for a character other than characters being currently operated by the game players. For example, a certain command is made for a runner while the game player on an offense is operating a batter, and a certain command is made for an outfielder while the game player on a defense is operating a pitcher.

Another characteristic of the command inputs is that no response is made in real time to a command input. For example, in response to a command input of a hit-and-run, after a pitcher has pitched, a runner beings to run.

The present embodiment includes 4 kinds of effective commands, offense, defense, fighting spirit and provocation. When these commands are inputted, as shown in FIG. 8, an image 340 of a coach is instantaneously displayed at a prescribed position on the game screen 300 to thereby indicate that the command has been inputted, and a motion in response to the command is made. For disturbing the other side, a feint command in response to which the coach image 340 is displayed without any motion following is included.

First, offense commands will be explained. The following commands can be inputted by pressing the A button 206 and the B button 208 in prescribed sequential orders while a game player is being operating a batter. The input commands are parenthesized. A+B means the A button 106 and the B button 208 are simultaneously pressed.

(1) Hit-and-Run (A÷A÷A)

When this command is inputted, all runners begin at once to run simultaneously with pitching. This command can be set at each pitching.

(2) Push Bunt (A÷A÷B)

When this command is inputted, a ball can be bunted more strongly than by a usual bunt.

(3) All Runners Steal (A÷B÷B)

When this command is inputted, all runners steal simultaneously with pitching. This command can be inputted at each pitching.

(4) Right Directed (A÷A+B)

When this command is inputted, a batted ball is corrected to go right. This command can be inputted at each pitching.

Defense commands will be explained. The following commands can be inputted by pressing the A button 106 and the B button 208 in a prescribed sequential order while a game player is operating a pitcher. The input commands are parenthesized.

(1) Bunt Shift (A÷A÷A)

When this command is inputted, a first runner and a third runner dash toward the home base simultaneously with pitching. This command can be inputted at each pitching.

(2) Quick Pitching (A÷A÷B)

When this command is inputted, pitching is performed in a quick motion. This command is effective when a runner is going to steal. When successful, most runners having a maximum lead and A-rank running power can be caught. However, when this command is used, a ball comes to the center by one to two balls from a commanded course. This command can be inputted at each pitching.

(3) Forward Fielding (A÷A+B)

When this command is inputted, the infielders and the outfielders are shaded a little forward simultaneously with pitching. This command can be inputted at each bat.

(4) Leftward Shift (A+B÷B)

When this command is inputted, all the outfielders are shifted right for a left-handed batter. This command can be inputted at each bat.

(5) Walk (A+B÷A)

When this command is inputted, a batter is walked. This command can be inputted at each bat. This command is effective only for the first pitching.

A fighting spirit command will be explained. An offense and a defense can use the fighting spirit command only once. The input command is B÷B÷B. When an offense game player inputs the fighting spirit command, parameters, such as power, meeting, etc., of a batter at the bat are raised by about two stages. When a defense game player inputs the fighting spirit command, pitching to a batter at the bat has a 150 km/h velocity, and a change-up can be sharper.

Next, a provocation command will be explained. The provocation command can be inputted by an offense and a defense. The input of the provocation command is limited to, e.g., once one credit, once three innings or other limitation. The input command is B÷A÷B.

When an offense inputs the provocation command, a batter, etc. makes the following provoking motions, based on current states. In the provoking motions, the ball of the pitcher has a 150 km/h velocity, and a change-up can be sharper.

(1) Announced Home Run

A bat is directed toward the center back screen. This provocation motion is made for batters. (2) Balloon Gum The motion of expanding and breaking a gum bubble is made. (3) Abu-san (absinthe)

The motion of splashing liquor (absinthe) onto a bat is made. This provocation motion is made when a batter is a pinch-hitter as an ace.

When a defense inputs the provocation command, a pitcher, etc. make the following provocation motions. When a provocation motion is made, power of an offense batter and meet are increased by one stage.

(1) Go to Hell, Guy!

The motion of directing the thumb downward is made. This provocation motion is made when a pitcher is Mr. Sano of Kintetsu except when a catcher is Mr. Furuta or Mr. Tamura.

(2) Balloon Gum

The motion of expanding a gum bubble large and breaking the bubble is made. (3) Mr. Sano, Kintetsu "Pikkari Pitching"

When a pitcher is Mr. Sano, Kintetsu, the "Pikkari Pitching" is made. In this case, opposite to the other provocation motions, power and meet of an offense batter are decreased by two stages.

(4) Mr. Furuta and Mr. Tamura "Whispering Strategy"

When a catcher is Mr. Furuta or Mr. Tamura, "whispering strategy" is made. A whispering motion is made, and words being whispered are displayed on a lower portion of the screen. In this case, opposite to the other provocation motions, power and meet of an offense batter are lowered by one stage.

Next, a feint command will be explained. When a command described above is inputted, an image of a coach is instantaneously displayed on the screen to indicate the successful input of the command. Even with the image of a coach displayed, no motion is made, to thereby disturb the counterpart. This is the feint command. A command input other than the described above are the feint command. It is possible to prepare a feint command in which an image of a coach alone is displayed when a command is inputted under invalid conditions.

Insert Events

Figure 9:
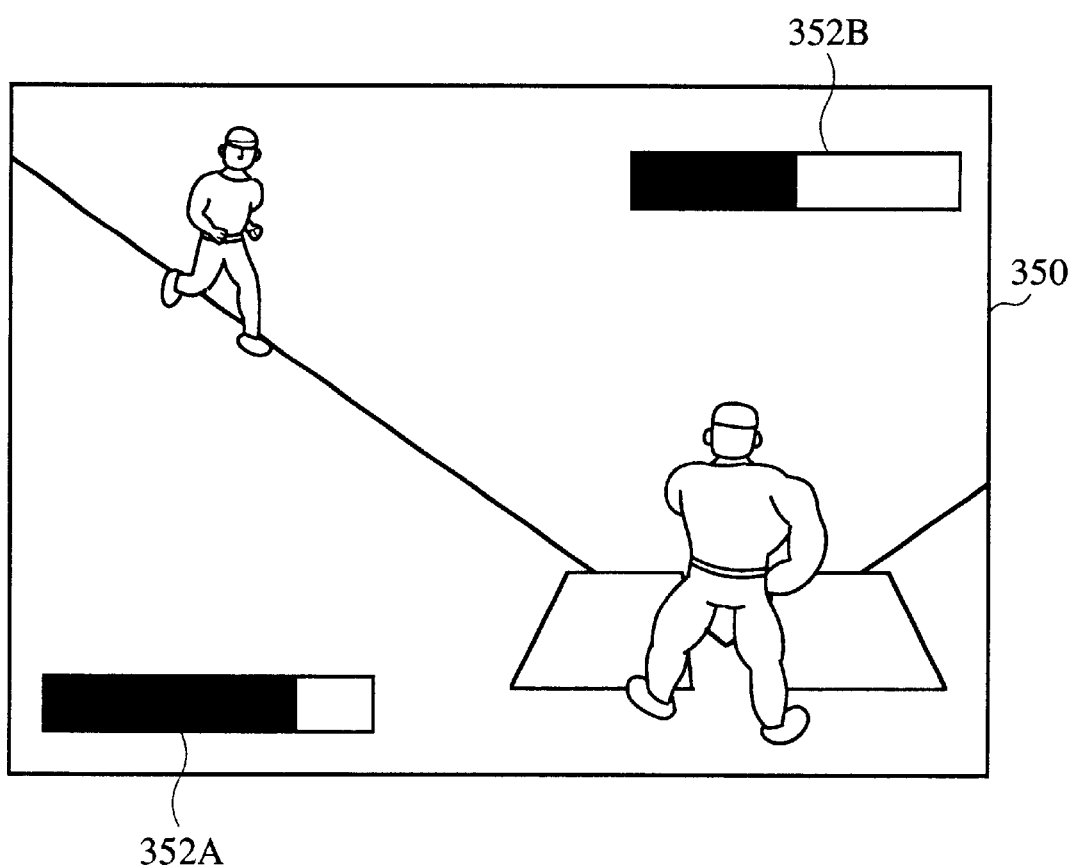
FIG. 9 is a view of an example of an insert event of the game apparatus of the embodiment of the present invention.

Next, insert events of the game apparatus according to the present embodiment will be explained with reference to FIG. 9.

In the present embodiment, when a play, such as a cross-play on the home base, headfirst slide of a batter runner to the first base, a running catch of an outfielder, etc. has been critically judged, the game is temporarily paused to insert a prepared event (small game), and the judgement is changed based on a play result of the event.

The insert event takes place in the following cases.

(1) Cross Play on the Home Base (Touch Play)

The cross play takes place when a timing of a runner reaching the home base and that of a ball being returned from the outfield to the home base are substantially the same.

(2) Showy Jumping Play of Outfielder

A triple sidewise somersault, a backward jumping catch, a jumping catch against a wall, a jumping catch while climbing up a wall, etc. are included. This play takes place when an instant at which a batted ball touches the ground or a timing of a batted ball impinging upon a fence, and a timing of an outfielder touching a ball before the ball bounds are substantially the same.

(3) Headfirst Slide of Batter Runner to the First Base

This headfirst slide takes place when a timing of a batter runner reaching the first base, and that of a throw arriving at the first base are substantially the same, or when the batter runner is a little later.

When an insert event takes place, as of this time the game is temporarily paused, and a command inputted immediately before the event takes place is temporarily saved. The command becomes valid when the event is finished, and the game is resumed.

In the present embodiment, for the insert event, the A buttons 206 and/or the B buttons 208 must be repeatedly pressed by the game players, and an insert event is judged based on a win in the continuous pressing. As insert events, games of other kinds may be used.

For example, when a runner is running to the home base, a ball is returned to the home base from the outfield, and when a timing of the judge is critical, an insert event takes place for the cross play. FIG. 8 shows an example of a game display 350 of the insert event.

When the insert event takes place, a display in which a catcher tries to catch a runner running toward the home base is presented. In the insert event the runner and the catcher are moved in about 3-time slow motion. On the left and the right sides of the game display 350 of the insert event there are displayed continuous power gauges 352A, 352B for both game players, and, as required, "Press repeatedly!" is displayed on the screen or sounded.

As both game players repeatedly press the A buttons 206 and/or the B buttons 208, indications of the repeated press power gauges 352A, 352B increase, and the game players can view their current situations. Both game players earnestly repeat the press of the A buttons 2206 and/or the 9 buttons 208.

When a prescribed game time for the insert event is over, a judgement which is advantageous to that of the game players whose repeated press power is higher is made. When the insert event is over, a display in which the runner and the catcher collide with each other on the home base, and a judgement result of out or safe is made. Then, the display before the insert event follows, and the game manipulated by the usual operation is resumed.

In the present embodiment the insert events of the baseball game have been explained, but insert events are applicable to other games.

For example, in a soccer game it is considered that an insert event is applicable to judge whether or not a defender can dodge a sliding. The defender can dodge the sliding if a game player of the defender who has been slided wins the insert event.

For example, in a football game an insert event is applicable to judge whether or not a tackle can be dodged. If a tackled game player wins the insert event, he can get out of the tackle.

For example, in a basketball an insert event is applicable to judge a scramble for a ball. A game player who has won the insert event can get the ball.

For example, in a car race game, an insert event is applicable to judge a course-out. Even when a car nearly rides on a shoulder, the car can steer the wheel to go back onto the course if a game player wins the insert event.

Catch Routine

Figure 10:
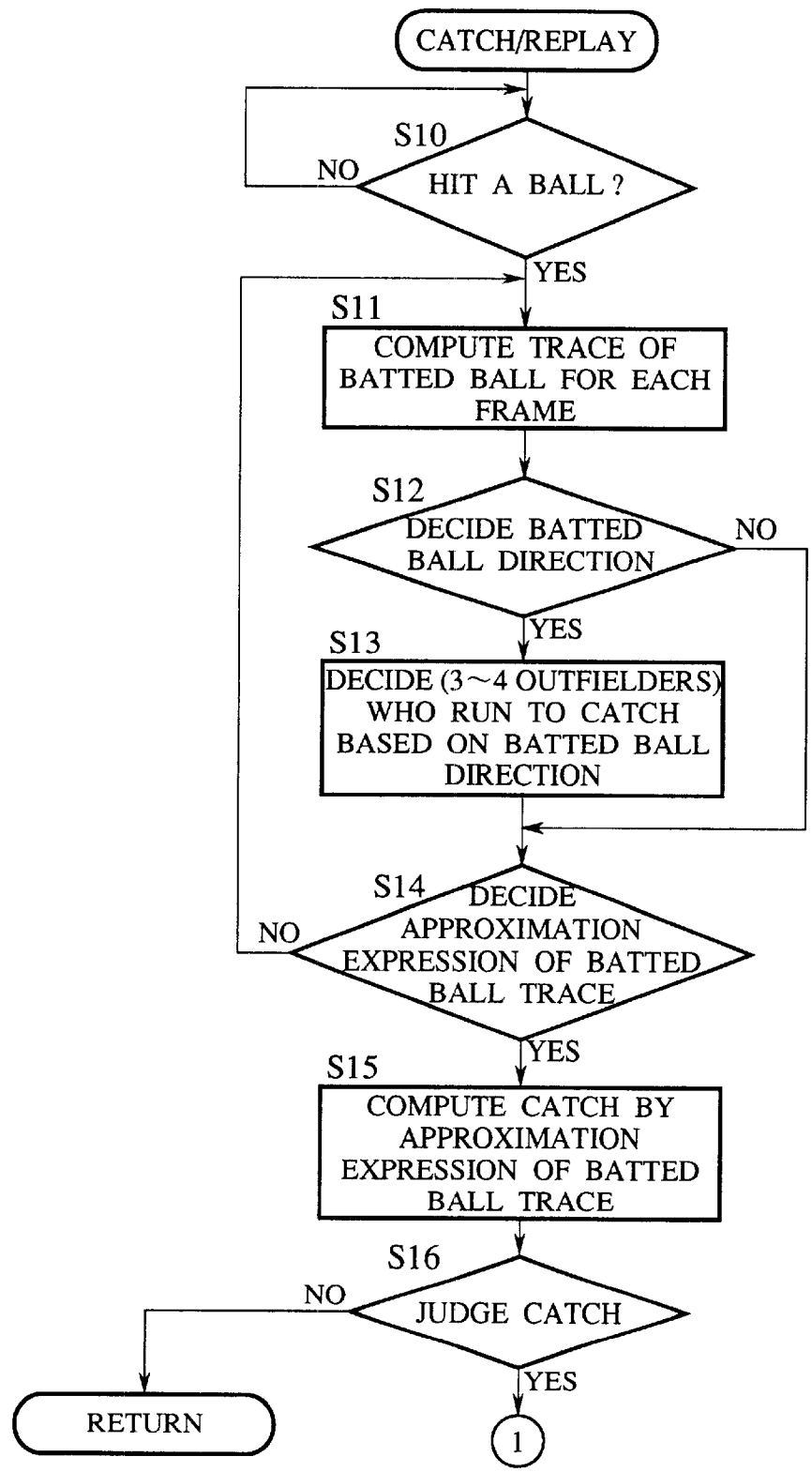
FIG. 10 is a flow chart (part 1) of a catch routine of the game apparatus of the embodiment of the present invention.
Figure 11:
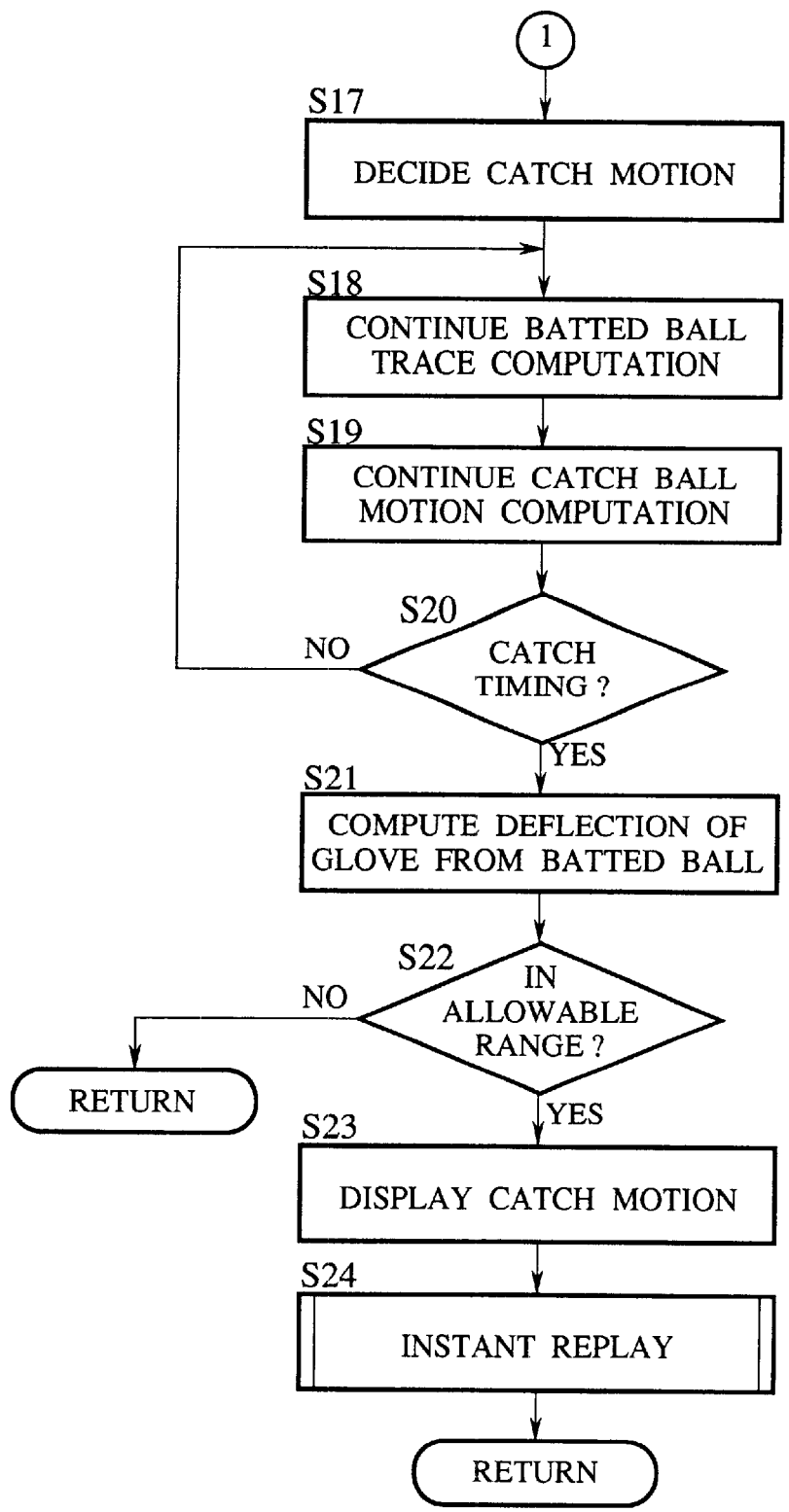
FIG. 11 is a flow chart (part 2) of a catch routine of the game apparatus of the embodiment of the present invention.
Figure 12:
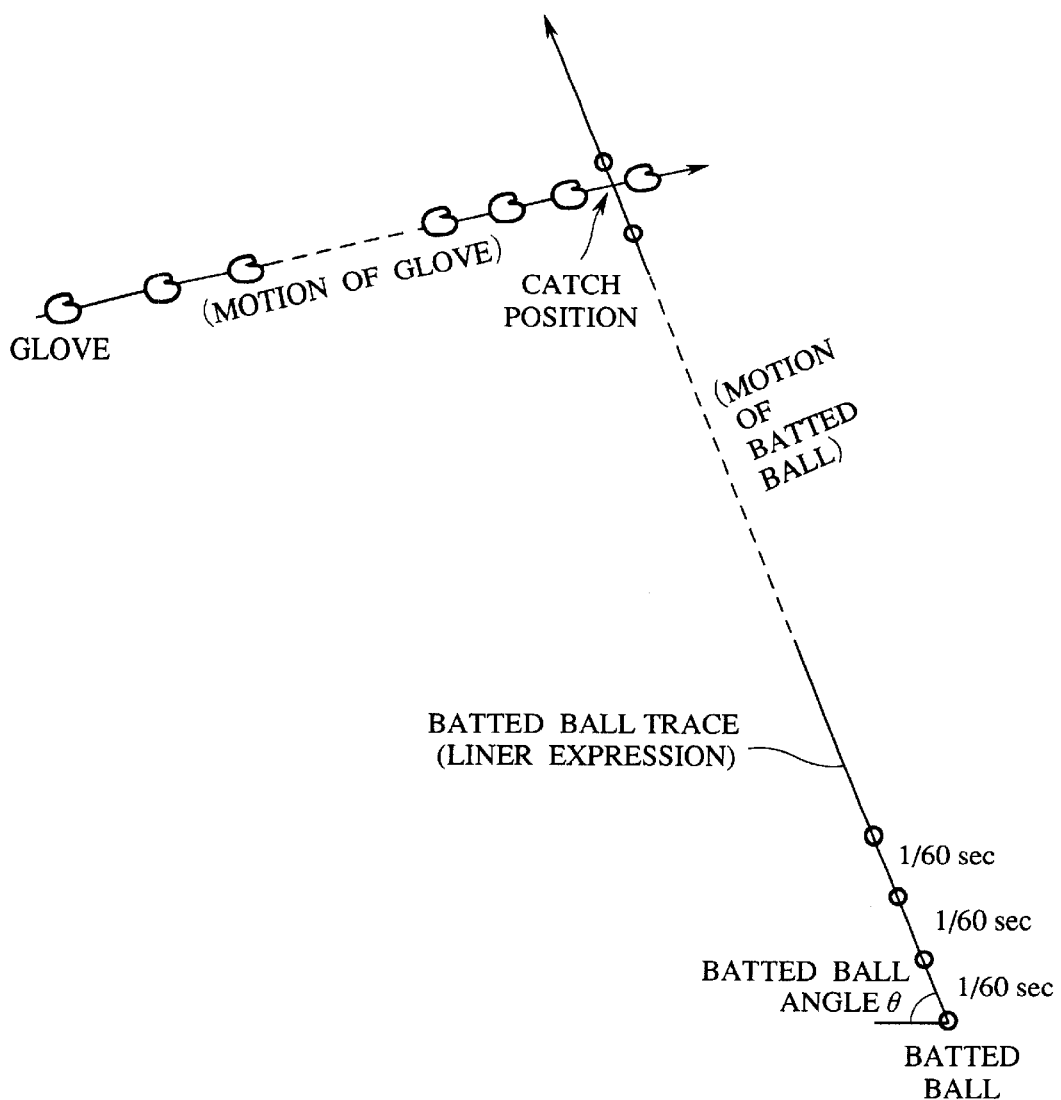
FIG. 12 is a view explaining a catch judgement of the game apparatus of the embodiment of the present invention.

Next, a catch routine of the game apparatus according to the present embodiment will be explained with reference to FIGS. 10 to 12.

In the present embodiment various position computations are performed in vacant times of video image displays, i.e., in vertical intervals. Accordingly, a position of a batted ball and a player's glove are not given in continuous traces but are given only in spaced dots as shown in FIG. 12. It should be taken into consideration that in judging a catch a trace of a batted ball and a trace of a player's glove are spaced-dots.

In the game apparatus according to the present embodiment, a height of the gloves of the players are set at preset heights, e.g., only at three stages. A catching motion of a player is a combination of some kinds of motions. A period of time in which these motions looks like a real catch and can be natural is very short. Accordingly, a range in which a player can catch a ball in a natural motion is very limited. If judgements are made strictly in this range, most batted balls will not be able to be caught, which will make it impossible for the game to be a game. Thus, in judging a catch a catch range should not be too strict. In replaying the catch it is necessary to correct a displacement of a catching position to display the image.

In computing a batting position it often takes place that a computation cannot be completed in a vertical interval, and a correct computation result cannot be given. In judging a catch this should be taken into consideration.

Catch/replay control of the game apparatus according to the present embodiment will be explained with reference to the flow chart of FIGS. 10 and 11

First, the catch/replay control stands by until a batter hits a ball (Step S10). When the batter hits the ball, a trace of the batted ball is computed for each frame of video images (Step S11). As described above, computation of a batted ball is performed for each frame, i.e., every 1/60 seconds, and accordingly positions of the batted ball are given in spaced dots as shown in FIG. 12.

Then, a direction of the batted ball is determined (Step S12). As shown in FIG. 12, when positions of the batted ball in several frames are computed, a batted ball angle Θ can be given. When a batted ball direction is not still determined, Step S14 follows.

When a batted ball angle Θ is determined, outfielders who move to catch the ball are determined based on the batted ball direction (Step S13). Usually several outfielders start to be moved toward the batted ball direction.

Next, an approximation expression of a batted ball trace is determined (Step S14). In the present embodiment a batted ball trace approximation expression is a linear expression because of a computation time. Batted ball positions for about 10 frames are computed to determine an approximation expression of a batted ball trace. When an approximation expression of a batted ball trace is not still determined, Step S11 follows. The computation of a batted ball trace is continued.

In the present embodiment an approximation expression for a batted ball trace is a linear expression, but a batted ball trace may be approximated by a multidimensional expression of above two-dimensions.

When a linear approximation expression for a batted ball trace is determined in Step S14, catch motions of the outfielders who have started to be moved in Step S13 are computed (Step S15). Subsequently, based on the computation result, it is judged whether or not a specific one of the outfielders can catch the ball (Step S16). The catch is judged possible when, as shown in FIG. 12, the batted ball trace and a trace of a motion of the glove in the catch motion intersect each other at a catch position, and the player's glove arrives at the catch position before the batted ball reaches the catch position. Whether the batted ball trace and the glove trace intersect each other at the catch position is not judged based on whether or not both traces strictly pass the same point but is judged based on whether or not both traces pass in a prescribed three-dimensional space. Whether or not the players's glove reaches the catch position is judged based on whether or not a distance between the batting position and a glove position which are nearest each other is in a prescribed range.

When it is judged in Step S16 that the ball is not caught, the main routine, not shown, follows.

When it is judged in Step S16 that the ball is caught, then an optimum catch motion is determined based on a distance between a catching outfielder and the batted ball trace (Step S17). Some motions are combined to determine this catch motion.

Subsequently, correct computation of the trace to the batting position is continued (Step S19). Correct computation of the catch motion of the player is continued (Step S19). Step S18 and Step S19 are continued until a catch timing is judged (Step S20).

When a catch timing is judged (Step S20), a positional deflection between the batting position and the glove position at this catch timing is computed (Step S21), and it is judged whether or not the positional deflection is within an allowable range (Step S22). When the positional deflection is not within the allowable range, it is judged that the ball cannot be caught, and then the main routine, not shown, follows. When the positional deflection is within the allowable range, the preset catch motion is displayed (Step S23).

In the present embodiment, a positional deflection is computed in Steps S21 and S22, and it is confirmed whether or not the positional deflection within an allowable range. This is based on the following reason.

A catch display may be displayed without again confirming a positional deflection because it is judged in Step S16 whether or not a ball is caught. However, as described above, the position computations in Steps S17 and S18 may not be completed in a vertical interval. In this case, a computed ball position is deflected, which results in delay of the ball. When the ball is displayed as delayed, the ball position may be largely deflected from a glove position although the ball is judged to be caught in Step S16. This makes the game players feel awkward, and they are not satisfied with the game. In the present embodiment, a positional deflection is finally confirmed and is confirmed to be within an allowable range.

After the catch motion is displayed in Step S23, the following instant replay is performed as required (Step S24). Then, the main routine, not shown, follows.

Instant Replay

Then, the instant replay of the game apparatus according to the present embodiment will be explained with reference to FIGS. 13 to 16.

In the present embodiment, short replay displays are made when showy plays, such as running catches, diving catches, slidings, touch plays, etc., are displayed. A replay display is displayed for about 2 seconds. The replay time is divided into two to three to display images taken at different positions by 2 or 3 cameras.

A replay display reproduces in slow motion an immediately preceding play display, but when one display is reproduced in slow motion, positional deflections stand out, which often makes the image display unnatural.

A cause for this is that, as described above, in the catch judgement, when a catch range is judged corresponding to a size of a glove in a display, most batted balls will not be able to be caught, and accordingly a catch range for the catch judgement is made larger than a size of a glove. Resultantly, when a catch motion in which a ball is correctly caught is replayed, a positional deflection stands out.

The positional deflection is due to the following causes.

For example, a computation error in the position computation causes the positional deflection. Small errors in the position computation are unavoidable, and the computation errors often cause positional deflection of images.

Positional errors in cases of high moving velocities cause the positional deflection. In a case of a high moving velocity, even a little computation error causes a large positional deflection.

The computation of a game display for each frame causes the positional deflection. When a position agrees with a time between a frame and the next frame, images in the frame preceding the time and the frame following the time are positionally deflected.

Limited kinds of play images cause the positional deflection. In displaying, e.g., a diving catch, because continuous images of catch motions for positional relationships of all the outfielders with balls are not prepared, those of the continuous images for that of the positional relationships which is approximate to a relationship between a position of an outfielder and a ball position are selected, and the positional relationship is displayed. Resultantly the positional deflection is caused.

Figure 14:
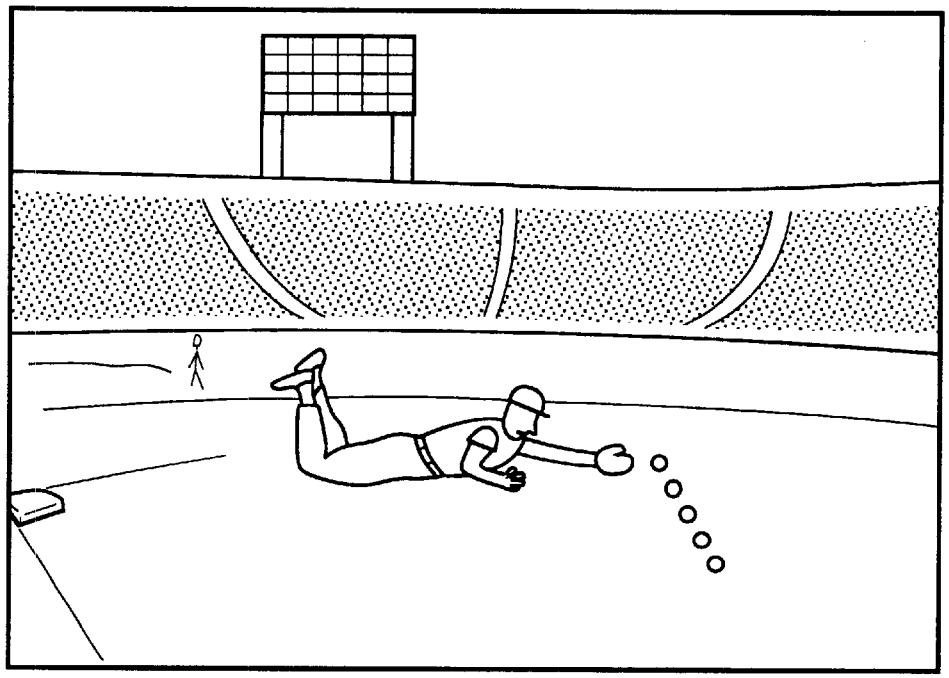
FIG. 14 is a view of an original image of an instant replay of the game apparatus of the embodiment of the present invention.

When a positional deflection takes place due to one of the above-described causes, in displaying, e.g., a catch motion, an image in which an outfielder's glove and a ball trace do not agree with each other is displayed as shown in FIG. 14. Even with a little positional deflection, the image can look natural in the normal image display, which are displayed at high speed. When replayed in slow motion, however, the image in which the ball is caught, with the positional deflection, is displayed.

Figure 15:
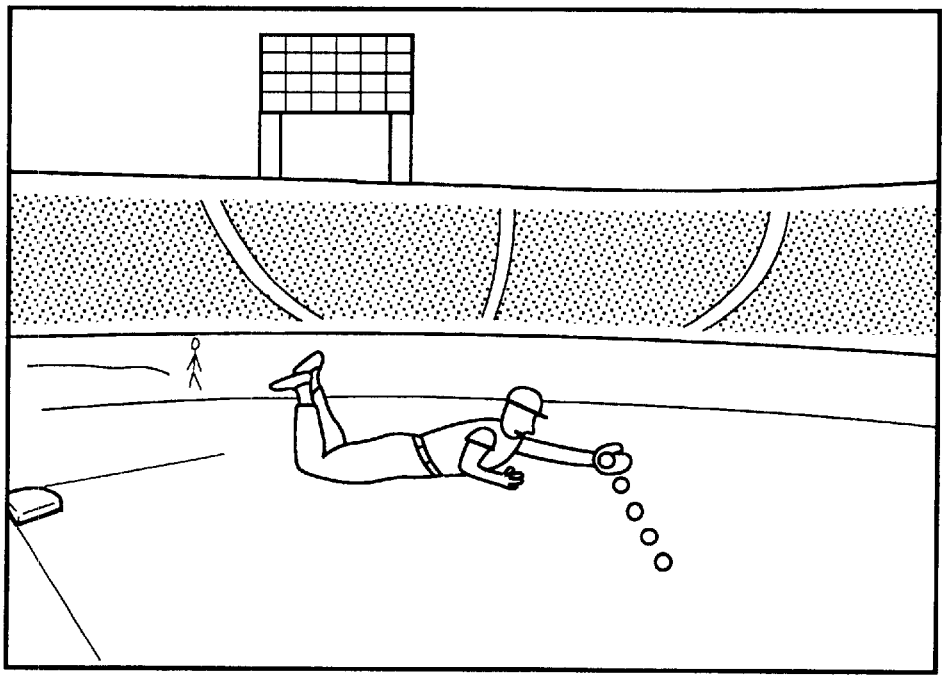
FIG. 15 is a view of a replay image of the instant replay of the game apparatus of the embodiment of the present invention.

In the present embodiment, when replayed, an outfielder's glove position and a ball position are agreed with each other, and continuous images are displayed. In other words, one of the outfielder's glove position and the ball position is changed to a position for continuous images to be used. As shown in FIG. 15, the continuous images with the outfielder glove and the ball trace completely agreeing with each other are displayed.

In order to delete such positional deflection it can be proposed, e.g., in a catch motion, to judge a ball to be caught only when an outfielder's glove and a trace of the ball completely agree with each other, and judge the ball not to be caught when both do not agree with each other. However, such judgement requires too strict a judgement standard.

In a touch play, when a start position of a runner and a position of a base for the runner to slide to are deflected from a positional relationship of a prepared sliding display, a display in which the runner slides to a position away from the base is made. The display can look natural in a normal image display, which is made at high speed, but, in a replay, looks awkward with the positional deflection. Then, in a replay, a start position of a runner is deflected to display an idealistic sliding motion.

Figure 13:
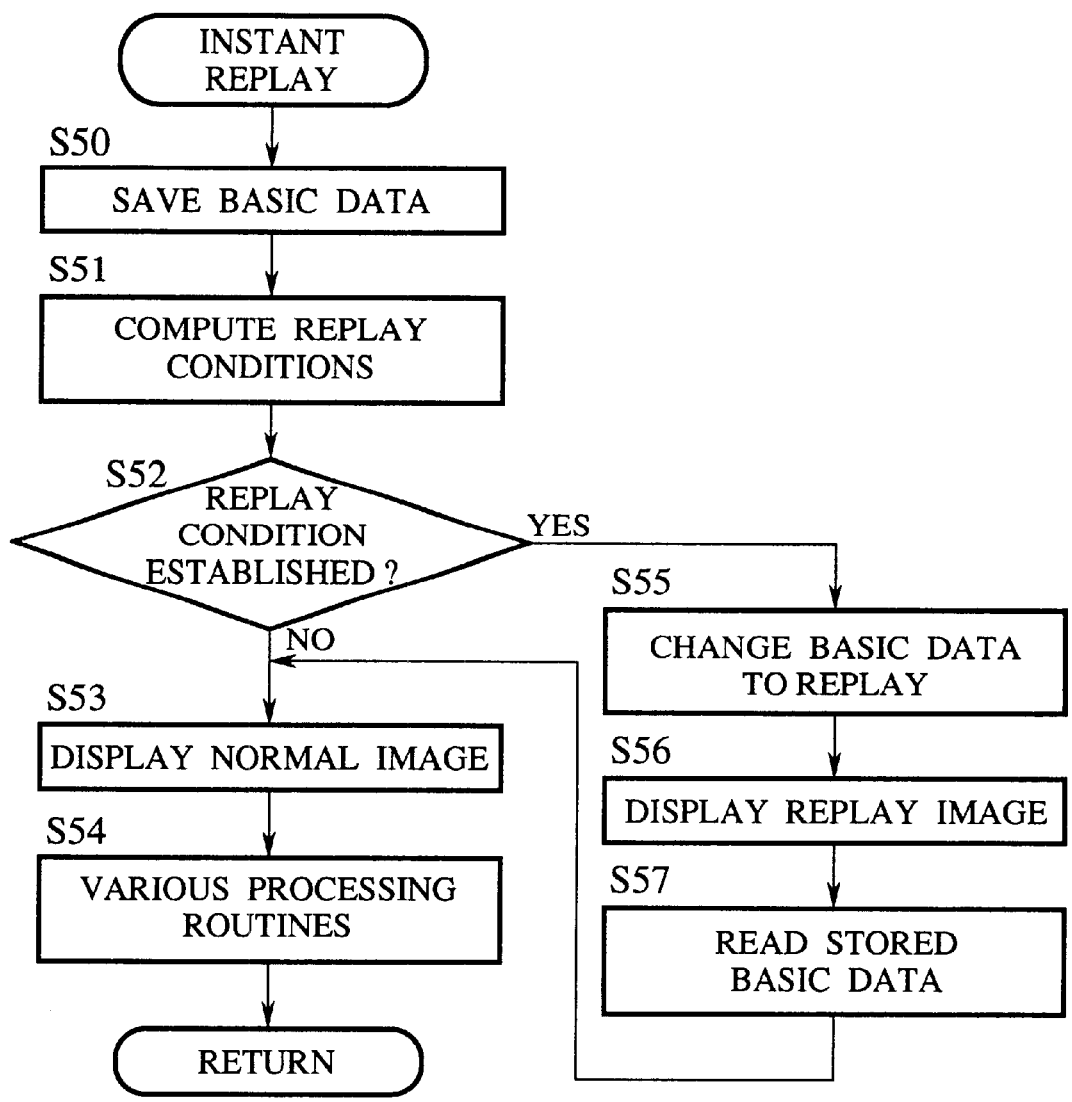
FIG. 13 is a flow chart of an instant replay operation of the game apparatus of the embodiment of the present invention.

A motion of the instant replay will be explained with reference to the flow chart of FIG. 13.

First, basic data for image displays for respective frames, i.e., players positions, directions of the bodies of the players, motions of the players, ball positions, ball motions, etc., are saved in the main routine (Step S50). Game images are formed on the basic data.

Next, replay conditions are computed (Step S51) Replay starting conditions are an infielder diving-catching and returning a ball; an outfielder making a running catch; and an outfielder making a sliding catch; for example.

Next, it is judged whether or not a replay condition has been established (Step S52). Unless a replay condition is established, a normal image is displayed (Step S53), various processing routines are executed (Step S54), and the first step S50 follows.

When it is judged that a replay condition is established in Step S52, the basic data are changed to the basic data for the replay (Step S55). When a glove position and a ball trace do not agree with each other as described above, basic data, parameters of an outfielder who is catching the ball, i.e., a kind of a catch motion, position data of the outfielder, a direction of the outfielder, etc. and parameters of the ball, i.e., position data of the ball, etc., are changed to agree the glove position with the ball trace. When a position of a hand of a sliding runner and a position of a base do not agree with each other, parameters of the runner, i.e., a kind of a motion of the runner, a starting position of the runner, etc. are changed to agree the position of the hand of the sliding runner with the base position.

Next, using the corrected basic data the replay image as shown in FIG. 15 is displayed (Step S56). When the display of the replay is over, the saved basic data are read, and the normal image display in Step S53 follows.

Player Change

Figure 16:
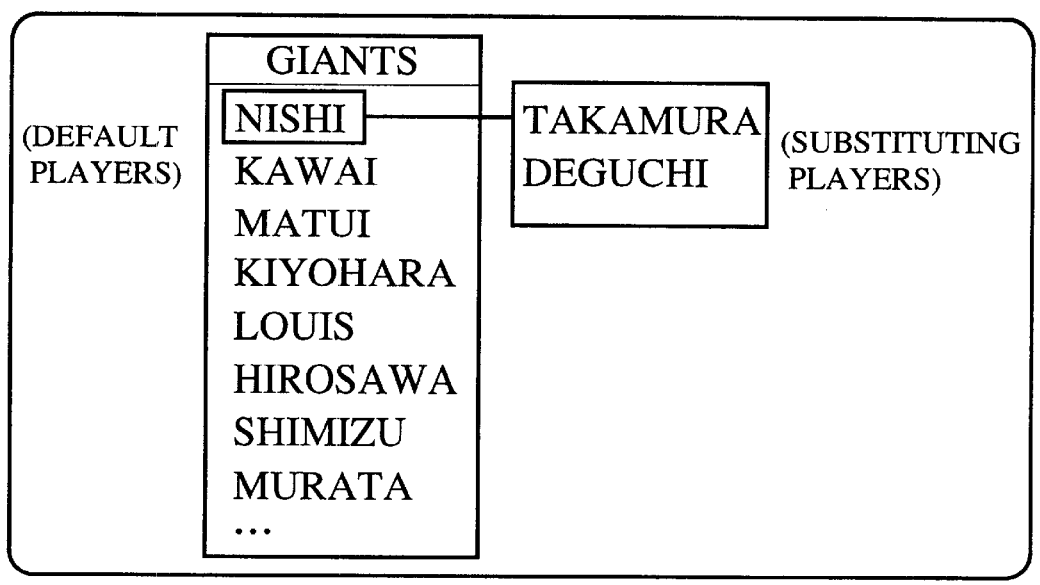
FIG. 16 is a view of a set image of player substitution of the game apparatus of the embodiment of the present invention.

Operation of changing players of the game apparatus according to the present embodiment will be explained with reference to FIG. 16.

In the present embodiment player change, which has been conventionally impossible, can be performed.

In conventional baseball games only a starting order can be changed in a game, but player changes cannot be performed. An order of players indicated as a starting order can be strategically changed in a game, but order changes can be performed only among the players in the starting order.

In conventional baseball games characters named with actual players' names are used, and even when a foreign player has returned home after a season was opened, or a player has been too injured to play in a season, in conventional baseball games the players registered at the start of the season must be used, which makes the games awkwardly different from the actual baseball games.

Then, in the present embodiment players other than the players registered as a starting order are registered in advance and can substitute, as required, for the players registered as the starting order. This substitution of the players can be performed by only by an administrator of the baseball game apparatus.

It is possible that the game players can operate to substitute players. In this case, in order to prevent the game players from disordering the registration of players, the registration is automatically returned to its initial state every time the game is over, whereby preferably registered players can be controlled by an administrator of the baseball game.

Operation of the player substitution will be explained.

First, a test mode is used, and a set image for substituting a player is displayed.

Next, a team in which the player will be changed is selected. If Giants is selected, the image as shown in FIG. 16 is displayed.

On the left side of the screen the team name and a starting order are displayed.

Then, a player in the starting order who will be substituted is selected. When the player is selected, as shown in FIG. 16, players who can substitute the player are displayed. Data, such as positions, etc., are registered for auxiliary players, and players who are substitutable are automatically selected based on the registered data and are displayed on the left side of the screen.

Then, a player who will substitute is selected out of the substitutable players. The substituted player is stored in a backup memory on the substrate. Thus, even when the power source is turned off, the renewed contents are retained, and the game is initialized with the changed starting order.

Next, the set display for the player substitution is over, and the test mode is over.

In a case that no auxiliary player who is able to substitute a player to be substituted is absent, no auxiliary player is displayed, whereby the game player can know the player cannot be substituted.

As described above, according to the present embodiment, players can be set in accordance with developments of an actual pennant race, and it can be prevented that foreign players who have returned home or players have been injured will play. On the site of stores registered players can be changed, whereby the game can be characterized by areas, and the baseball game can have variations. The substitution of a player as required makes the game players play always feel fresh to play the baseball game.

The present embodiment is not limited to the above-described embodiment and covers other various modifications.

In the above-described embodiment the present invention is applied to the baseball game, but may be applied to other games, e.g., soccer games, racing games, etc.

What is claimed is:

1. A game image display method for displaying an image to relay a specific scene in an advancing game, comprising:

receiving an input from a game player;

displaying a game image;

correcting a parameter of a motion of a mobile object on a specific scene of said image, the specific scene including a scene on which it is judged that a first object impinges on a second object; and reproducing the specific scene based on the corrected parameter such that a position of the first object agrees with a position of the second object on said scene.

2. A game image display method according to claim 1, further comprising:

replaying said image in slow motion on the specific scene.

3. A game image display method according to claim 2, wherein said acts of judging and reproducing further comprise:

judging on the specific scene that the first objects impinges on the second object when a distance between the first and the second objects is within a prescribed range; and changing a positional parameter of the first object and/or the second object so that a position of the first object agrees with a position of the second object in the reproduced display on the specific scene.

4. A game display method according to claim 1, wherein on the specific scene a first object impinges on a second object further comprising:

judging on the specific scene that the first object impinges on the second object when a distance between the first and the second objects is within a prescribed range; and changing a positional parameter of the first object and/or the second object so that a position of the first object agrees with a position of the second object in the reproduced display on the specific scene.

5. A storage medium storing a program for executing an image replay method, said method comprising:

receiving an input from a game player;

displaying a game image;

correcting a parameter of a motion of a mobile object on a specific scene of said image, the specific scene including a scene on which it is judged that a first object impinges on a second object; and reproducing the specific scene based on the corrected parameter such that a position of the first object agrees with a position of the second object on said scene.

6. A storage medium according to claim 5 wherein said method further comprises:

replaying said image in slow motion on the specific scene.

7. A storage medium according to claim 5 wherein said method further comprises:

judging on the specific scene that the first object impinges on the second object when a distance between the first and the second objects is within a prescribed range; and changing a positional parameter of the first object and/or the second object so that a position of the first object agrees with a position of the second object in the reproduced display on the specific scene.

* * * * *